US008636303B2

(12) United States Patent
Gaussin et al.

(10) Patent No.: US 8,636,303 B2
(45) Date of Patent: Jan. 28, 2014

(54) MODULE FOR THE MODULAR FRAME OF A HEAVY LOAD TRANSPORT VEHICLE

(75) Inventors: Christophe Gaussin, La Conversion (CH); Pho-Trung Chau, Hericourt (FR); Reginald Fenix, Champey (FR)

(73) Assignee: Envision Vehicle Engineering Novasio Technology Event, Hericourt (FR)

( * ) Notice: Subject to any disclaimer, the term of this patent is extended or adjusted under 35 U.S.C. 154(b) by 23 days.

(21) Appl. No.: 13/140,179

(22) PCT Filed: Nov. 26, 2009
(Under 37 CFR 1.47)

(86) PCT No.: PCT/FR2009/052315
§ 371 (c)(1),
(2), (4) Date: Nov. 7, 2011

(87) PCT Pub. No.: WO2010/076442
PCT Pub. Date: Jul. 8, 2010

(65) Prior Publication Data
US 2012/0181781 A1 Jul. 19, 2012

(30) Foreign Application Priority Data
Dec. 16, 2008 (FR) .................................... 08 58657

(51) Int. Cl.
*B62D 21/00* (2006.01)
(52) U.S. Cl.
USPC ............ 280/781; 280/784; 180/311; 180/312
(58) Field of Classification Search
USPC ................... 280/781, 784, 785; 180/311, 312
See application file for complete search history.

(56) References Cited

U.S. PATENT DOCUMENTS

| 7,137,466 B2 * | 11/2006 | Kawasaki et al. ............. 429/408 |
| 7,490,856 B1 * | 2/2009 | Kuhns ........................... 280/789 |
| 7,513,329 B2 * | 4/2009 | Nakashima et al. .......... 180/312 |
| 7,997,619 B2 * | 8/2011 | Sugimoto ..................... 280/793 |
| 8,136,858 B2 * | 3/2012 | Gosselin et al. ............. 296/26.1 |
| 8,141,904 B2 * | 3/2012 | Akaki et al. .................. 280/784 |
| 8,231,166 B2 * | 7/2012 | Mori ........................ 296/187.09 |
| 2004/0056468 A1 | 3/2004 | McNally |
| 2011/0047772 A1 * | 3/2011 | Gosselin et al. ............. 29/401.1 |

FOREIGN PATENT DOCUMENTS

| EP | 1 318 064 A2 | 6/2003 |
| EP | 1 588 929 A2 | 10/2005 |

* cited by examiner

*Primary Examiner* — Toan To
(74) *Attorney, Agent, or Firm* — Laurence A. Greenberg; Werner H. Stemer; Ralph E. Locher

(57) ABSTRACT

The invention relates to a module for the modular frame of a heavy load transport vehicle, characterized in that it comprises, at one end thereof, a junction surface having an oblique bearing surface extending between two parallel planar surfaces inclined relative to the previous one. The invention also relates to a method for mounting such modules. The invention relates to a frame that comprises at least two such modules in which the junction surfaces together define an assembly with an oblique scarf joint, an unabutting scarf joint or key joint. The invention also relates to a harbor vehicle comprising at least one such frame and at least one such module.

12 Claims, 2 Drawing Sheets

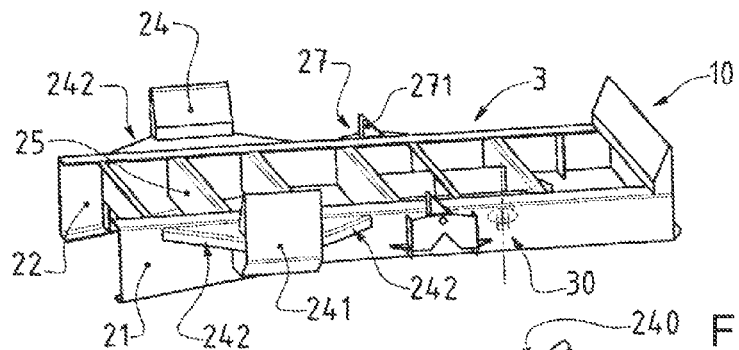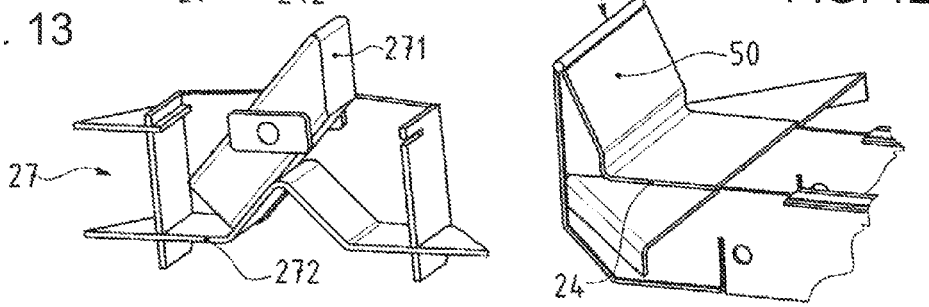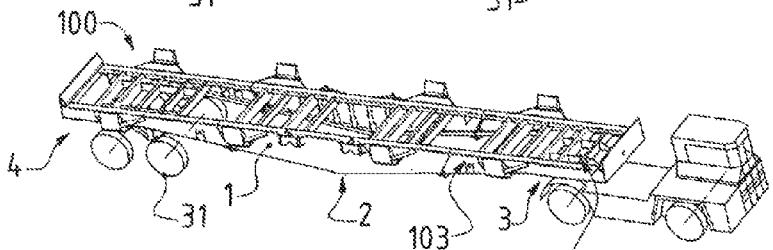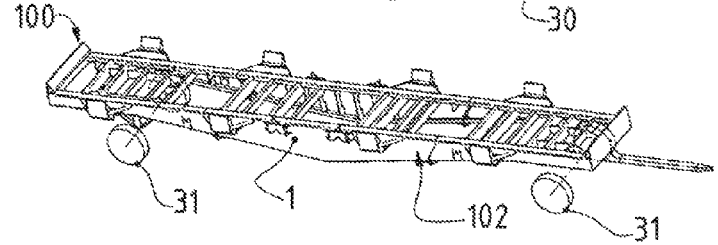

MODULE FOR THE MODULAR FRAME OF A HEAVY LOAD TRANSPORT VEHICLE

BACKGROUND OF THE INVENTION

Field of the Invention

The present invention relates to a module for a modular chassis of a vehicle for transporting heavy loads.

The invention also relates to a method of mounting such modules and to a tool for implementing this method.

The invention also relates to a modular chassis of a vehicle for transporting heavy loads having at least two modules each having at at least one end a joining surface designed to be able to engage with a complementary joining surface on the other module.

The invention also relates to a port vehicle having at least one such chassis or at least one such module.

The present invention relates more particularly to the field of heavy handling, and in particular port handling.

The development of port handling is characterized by the carrying, on one and the same ship, of ever larger loads. In particular, containers represent the essence of the commercial payload transported other than in bulk. The immobilization of a ship at the dock is expensive and handling means must be suitable for emptying or introducing as rapidly as possible the entire load that must be carried on or unloaded from a ship during a stopover.

A port services provider has to adapt his ground handling fleet to the developing nature of the load. This load generally consists of containers of the maritime type, the most common ones having a length of 20, 30, 40 or 45 feet, from among the known standards of 8, 10, 15, 20, 30, 40, 45, 48, 50, 53 or even 60 feet. The volume of a 20-foot container serves nowadays as a comparative unit of measurement, known as TEU, or twenty-foot equivalent unit.

Special loads can consist of large-dimension assemblies, both in terms of length and of width and height, and in some cases have a very high mass. The services provider does not have special vehicles for every scenario and must envision adapting or/and combining the multipurpose means that he has available.

Telescopic semitrailers, of the low-floor type or having a single beam, are known in the road transport of vehicles or of logs. However, these vehicles are poorly suitable for transporting heavy loads which have very variable centering, such as can be the case with containers, it being possible for a single 20-foot container, according to the standard NG ISO 668, to have a total loaded mass of 34 800 kg. The twinning of such containers is frequent. Cross-bars, known as spreaders, which load/unload docked ships are already capable of transporting at least four containers arranged in two rows of two, which can represent, with small 20-foot containers, a load of around 140 metric tons, this not being compatible with a telescopic system of beams that slide in one another, as are known from the prior art. Specifically, in heavy handling, and in particular in port handling, it is generally desired to arrange the load as close as possible to the ground, for obvious safety reasons, and this stops the chassis or vehicles and trailers from being overdimensioned.

It is also known to form chassis of modular trailers in the manner of engineering military bridges, the modules consisting of prismatic box structures fitted together end to end with a straight edge. Here again, the problem arises of dimensioning for flexural strength, which is often estimated empirically and translates into large sections, high consumption of steel, a high weight, which harms the energy performance of the tractor-trailer assembly or the train of trailers as the case may be. This design also has the problem of the shear strength of the connection pieces, in particular of the bolts.

BRIEF SUMMARY OF THE INVENTION

The aim of the invention is to enable a port services provider to adapt his ground handling fleet to the nature of the load. The invention also proposes making it easier to maintain his fleet of rolling stock.

To this end, the invention relates to a module for a modular chassis of a vehicle for transporting heavy loads, characterized in that it has at at least one of its ends a joining surface which has at least one oblique support surface that extends between two planar surfaces that are parallel to one another and inclined with respect to said oblique support surface.

The invention also relates to a method of mounting such modules, and a tool for implementing this method.

The invention also relates to a modular chassis of a vehicle for transporting heavy loads, having at least two modules, each having at at least one end a joining surface designed to be able to engage with a complementary joining surface on another module, characterized in that said joining surface and said complementary joining surface form together an assembly having an oblique scarf joint, having an unconnected skew scarf joint or having a key.

According to one feature of the invention, said chassis is dimensioned to carry marine containers of 8, 10, 15, 20, 30, 40, 45, 48, 50, 53 or 60 feet.

The invention also relates to a port vehicle having at least one such chassis or at least one such module.

According to one feature of the invention, this vehicle is a trailer or a semitrailer.

BRIEF DESCRIPTION OF THE SEVERAL VIEWS OF THE DRAWING

Further features and advantages of the invention will become apparent from the following detailed description of nonlimiting embodiments of the invention, with reference to the appended figures, in which:

FIG. 11 schematically shows a perspective bottom view of a detail of a module according to the invention;

FIG. 12 schematically shows a perspective top view of another detail of a module according to the invention;

FIG. 13 schematically shows a perspective top view of yet another detail of a module according to the invention;

FIGS. 14, 15 and 16 schematically show respectively a self-propelled vehicle, a semitrailer and a trailer for transporting containers according to the invention.

DESCRIPTION OF THE INVENTION

Figure 1:
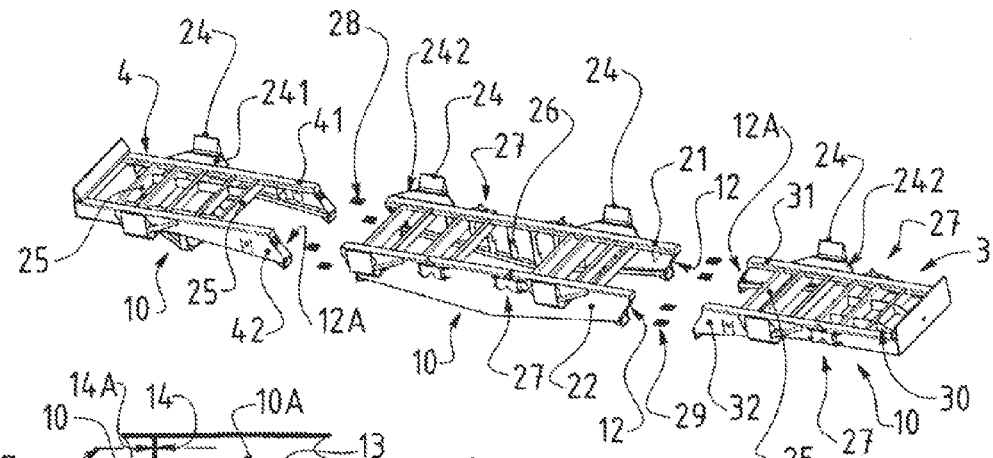
FIG. 1 schematically shows a perspective and exploded view of a chassis having modules according to the invention.

The present invention relates more particularly to the field of heavy handling, in particular port handling.

The invention relates to a module 10 for a modular chassis 1 of a vehicle 100 for transporting heavy loads.

Such a module 10 can have different forms, as shown in the rest of the description, with examples of modules 10 under the references 2, 3, 4, 200, 201, 202, 300, 400, 401.

According to the invention, in order to ensure at the same time the best flexural behavior of the chassis 1 of the vehicle 100 formed by such modules 10, a module 10 has at at least one of its ends a joining surface 12 which has at least one oblique support surface 13 that extends between two planar surfaces 14 and 15 that are parallel to one another and inclined with respect to said oblique support surface 13.

Figure 2:
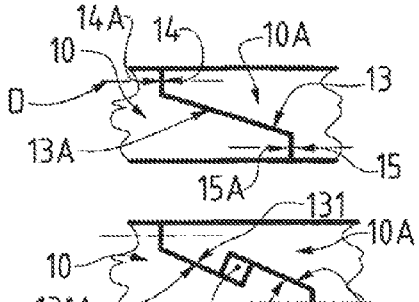
FIG. 2 schematically shows an elevation view of a first variant of fitting such modules together.

Such a module 10 is designed to be able to engage with, as the case may be, a structure to which it is attached, or else with another module 10A, said structure or said other module 10A having a complementary joining surface 12A which has at least one complementary oblique support surface 13A that extends between two complementary planar surfaces 14A and 15A that are parallel to one another and inclined with respect to said oblique support surface 13A, as is shown in FIG. 2, the module 10 then forming with said structure or with said other module 10A an assembly having an oblique scarf joint, known as an unconnected skew scarf joint.

The load applied to the module 10A is absorbed by the oblique surface 13, and such an assembly, which is only used in wooden framework, and is introduced here in an innovative manner in metal structures, provides very good flexural strength. Such an assembly is designed to hold, statically, under the effect of the weight of each of its components, and of forces applied thereto parallel to the planes of their planar surfaces 14, 14A, 15 and 15A. Since the vehicles 100 are intended to travel on uneven ground, and to perform turns, it is nevertheless necessary to add mechanical fastening means, if only to ensure transverse retention. To this end, fitting elements such as bolts or the like are deployed in a direction D perpendicular to the planes of the planar surfaces 14, 14A, 15 and 15A and at the level of the latter. The assembly having a scarf joint makes it possible for these fitting elements to operate only in traction without any shear forces.

Figure 3:
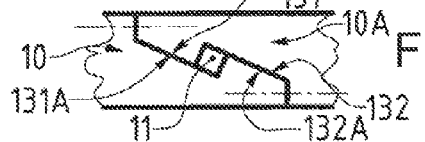
FIG. 3 schematically shows an elevation view of a second variant of fitting such modules together.

FIG. 3 illustrates a fitting variant having a scarf joint having a key: the joining surface 12 then has two oblique support surfaces 131 and 132 which are parallel to one another, and the joining surface 12A also has two oblique support surfaces 131A and 132A which are parallel to one another. The length of the surface 132 is less than that of the surface 132A and the length of the surface 131A is less than that of the surface 131. Thus, in the mid part of the assembly, there is left a space which is designed to be able to hold a key 11 that secures the assembly known as an oblique scarf joint having a key. Such a key 11 improves the behavior in traction of the connected assembly. It also makes it possible, in certain cases, to dispense with fitting screws. Such a key 11 can have parallel faces or else be in the form of a wedge.

The invention also relates to a modular chassis 1 of a vehicle for transporting heavy loads having at least two such modules, each having at at least one end a joining surface designed to be able to engage with a complementary joining surface on another module. In this chassis 1, according to the invention, said joining surface and said complementary joining surface form together an assembly having an oblique scarf joint, having an unconnected skew scarf joint or having a key. Such a modular chassis 1 makes it possible in particular to construct vehicles 100, in particular port vehicles, for transporting ISO containers. Such a chassis 1 can of course be used for other applications, on account of its highly multipurpose nature.

FIGS. 4 to 8 show a plurality of types of modules 10, and a plurality of conceivable combinations, depending in particular on the nature of the load to be transported and on the distribution of its mass.

Figure 4:
FIG. 4 schematically shows a partial elevation view of an example of the combination of modules, in a longitudinal direction, similar to FIG. 1.
Figure 7:
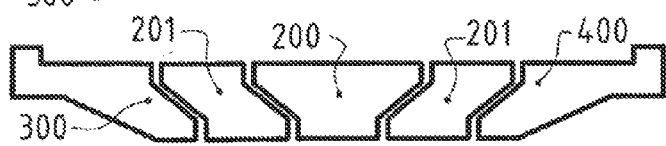
FIGS. 7 and 8 schematically show partial elevation views of yet more examples of the combination of modules.

FIG. 4 illustrates the preferred configuration, with an intermediate module 200 of a first type enclosed by end modules of a first type 300 and 400, the intermediate module 200 then forming a keystone. The module 400 can in particular be identical to the module 300. FIG. 7 illustrates an extended variant thereof, having extension modules 201, the oblique surfaces of which are parallel to one another.

Figure 5:
FIG. 5 schematically shows a partial elevation view of another example of the combination of modules.
Figure 6:
FIG. 6 schematically shows a partial elevation view of an example of the combination of two modules.

FIG. 6 illustrates another variant, combining an end module of the first type 300 and an end module of a second type 401, the joining surface 12 of which is complementary to that of the end module of the first type 300. FIG. 5 illustrates an extended variant thereof with an extension module 201 inserted.

Figure 8:
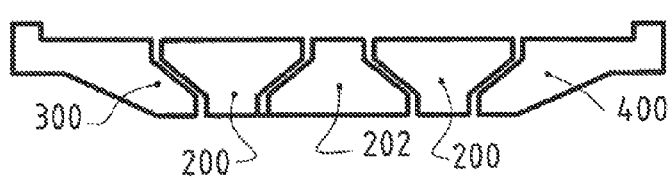

FIG. 8 illustrates another variant, incorporating an intermediate module 202 of a second type, each of the joining surfaces 12 of which is complementary to that of the end module of the first type 300. This example combines an intermediate module 202 of a second type which is enclosed by two intermediate modules 200 of a first type, which are themselves enclosed by end modules of a first type 300 and 400.

It is understood that numerous configurations can be produced with a small number of types of modules, in this case limited to five within the scope of these examples.

Figure 9:
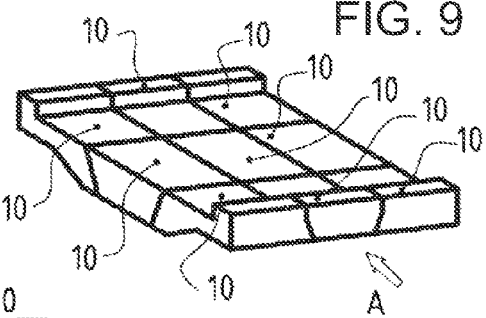
FIG. 9 schematically shows a perspective view of a combination of modules in a transverse direction.
Figure 10:
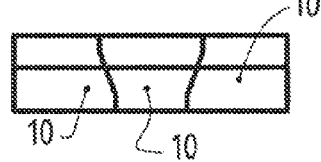
FIG. 10 is an end view of the combination from FIG. 9.

A chassis 1 according to the invention has a plurality of connected modules 10. It is understood that while connection in the lengthwise, or longitudinal direction, as shown in FIG. 1 and in FIGS. 4 to 8, is the preferred application, the chassis 1 can also be composed of a plurality of modules connected in the widthwise, or transverse direction, as shown in FIG. 9 and in FIG. 10 as seen in the frontal direction A, in order to carry very bulky loads, or quite simply to multiply the carrying capacity for containers by a whole number. A vehicle 100 can thus have a matrix-type chassis 1 with elements connected both lengthwise and widthwise, like the one shown in FIG. 9.

The same organization of the space is also possible in the third, height direction, which is advantageous in ports or in the field of the handling of very heavy loads, in particular in order to act on the distribution of loads on the load-bearing axles or/and engines, and in particular to carry ballast located in appropriate regions of the vehicle structure. This ballast is preferably loaded on top of a basic chassis 1 and can itself result from stacking a plurality of ballast sheets.

Consequently, the chassis 1 according to the invention can have three-dimensional modularity.

Preferably, and as shown in FIG. 1, the module 10 has at least two side members 21 and 22, in particular having a U-shaped profile with a variable section that is optimized for mechanical strength in a longitudinal direction. The module 10 advantageously has at least one cross member submodule 24 for taking the load in a transverse direction, said side members and cross member forming a flexurally and torsionally rigid box assembly.

The cross member submodule 24 is fitted on the side members 21 and 22 by a mechanical connection of the half-length type. The cross member submodule 24 ensures the function of guiding and retaining the load, in particular containers, on the chassis 1 and forms a V-block for centering at the same time as means for stopping at sloped wedges 50. The latter are terminated at their upper end or turned toward the load by radiused regions that are obtained by shaping sheet metal, or by connected tubes or rounds 240, so as to enable nonaggressive contact between the cross member submodule 24 and the containers, as is shown in FIG. 12. The parts of the cross member submodule 24 that are offset with regard to the side members 21 and 22 form arms 241; the latter and the sloped wedges 50 are advantageously produced as per application FR 07 59762 from the same applicant.

In an innovative and advantageous manner, the most protruding regions of the chassis 1, which are generally formed by such arms 241, extending toward the outside of the chassis, of cross member submodules 24, are protected, preferably on either side, by oblique bumpers 242. The latter, which have a rigid design in the form of a slide, are designed to be able to deflect the module 10 during a collision with an obstacle, and thus make it possible to divert the path of the vehicle 100 incorporating such a module 10 away from the obstacle. Moreover, they form stiffening means for the arms 241 in a horizontal plane. The module 10 also has cross members 25 and gussets 26 for stiffening purposes.

The module 10 preferably has inertial blocker submodules 27, each having at least one mobile stop 271 which is designed to come into abutment against a fixed stop 272, as can be seen in FIG. 13. Advantageously, these modules 27 are produced as per application FR 07 56916 from the same applicant.

The chassis 1 according to the invention has at least two modules. In one particular exemplary embodiment, as shown in FIG. 1, the chassis 1 forms the structure of a port semitrailer 103, as shown in FIG. 15, which has three modules:
 a first end module 3;
 a second end module 4;
 an intermediate connecting module 2.

The module 2 in FIG. 1 has two side members 21 and 22 and two cross member submodules 24. This particular module 2, called the intermediate module, has four joining surfaces 12 at the ends 28 of the side members 21 and 22. The modules 3 and 4 are fitted to the module 2 at these ends 28 by using fitting elements 29 such as bolts or the like. The specific forms of the joining surfaces 12 and the complementary joining surfaces 12A on the opposing modules enable the precise and rigid interlocking of the modules 2, 3 and 4 with one another and avoid any shear stress in the fitting elements 29. The latter can, depending on the type of stressing of the chassis assembly formed by the fitting together of the modules, be mounted, as shown in the figures, parallel to the lengthwise direction of the chassis, or else in the direction perpendicular to this same direction.

Similarly, the end module 3 of the example in FIG. 1 has two side members 31 and 32 of a type similar to the side members 21 and 22, and a submodule 24. The module 3 also has cross members 25 and inertial blocker submodules 27. The module 3 in this example has a box-like structure at its end opposite the one where it is fitted to the module 2, in order to support the loads generated by a semitrailer kingpin 30, as can be seen in FIG. 11. This module 3 has complementary joining surfaces 12A designed to be able to engage with joining surfaces 12 of the module 2.

The end module 4 of the example in FIG. 1 has two side members 41 and 42 of a type similar to the side members 21 and 22 and has a box-like structure at its end opposite the one where it is fitted to the module 2, in order to support the loads generated by at least one axle 31, as can be seen in FIG. 15.

This module 4 has complementary joining surfaces 12A designed to be able to engage with the joining surfaces 12 of the module 2.

Preferably, the chassis 1 consisting of these modules of type 10 is dimensioned to carry ISO maritime containers of 8, 10, 15, 20, 30, 40, 45, 48, 50, 53 or 60 feet. To this end, the modules of type 10 are advantageously each longitudinally dimensioned to hold a submultiple, the exact number or a multiple of the length of standard containers. Preferably, they are each longitudinally dimensioned to hold a submultiple, the exact number or a multiple of a 20 foot ISO 668 standard container. Preferably, the modules 10 are equipped to hold length stops in order to longitudinally stop containers, or incorporate such stops in their structure. Advantageously, these longitudinal stops are also formed by blocker submodules 27.

In an innovative and particularly advantageous manner, at least one module 10 has such sub-blocker modules 27, which are designed to be able to act in a transverse direction of the module 10, and preferably of the chassis 1, and not just in the longitudinal direction corresponding to the length of the containers. Consequently, the module 10 has sub-blocker modules 27, some of which are designed to be able to act in a longitudinal direction of the module 10 and others of which are designed to be able to act in a transverse direction of the module 10, these latter not being shown in the figures. This is particularly advantageous if the module 10 is designed to hold a plurality of containers side by side in the transverse direction, in particular to directly hold the load of a multi-container cross-bar, or spreader.

The invention also relates to a port vehicle 100 having at least one chassis 1, or at least one such module 10. This vehicle 100 can be, as the case may be, a self-propelled vehicle 101 for transporting containers, as is shown in FIG. 14, a port trailer 102 for transporting containers, as is shown in FIG. 16, or a semitrailer 103 for transporting containers, as is shown in FIG. 15, these examples of combinations of modules being in no way limiting.

The invention also relates to a method of fitting together such modules 10 in pairs, according to which two modules 10 are placed end to end in order to engage a joining surface 12 on one of said modules with a complementary joining surface 12A on the other module, such that said joining surface 12 and said complementary joining surface 12A form together an assembly having an oblique scarf joint, having an unconnected skew scarf joint or having a key 11, and said modules 10 are then secured with at least one key 11 or/and fitting means 29.

The invention also relates to a mounting tool for implementing this method, having means for lifting one of the modules 10 with respect to the other in order to engage said joining surface 12 with said complementary joining surface 12A, and means for guiding, in a direction perpendicular to the planar surfaces of said joining regions, one of said modules 10 with respect to the other.

To this end, each module 10 advantageously has indicating or/and aligning means for making it easier to position it next to another module 10 and to fit it to the latter. In a first variant, the module 10 has at least two bores, or trunnions, near the joining surface 12 and facing toward the outside of the module, these bores or trunnions being designed to be able to engage with at least two trunnions, or two bores, on or in the mounting tool. In another variant, which can be combined with the preceding variant, the indicating or/and aligning means are formed by at least one surface designed to be able to take the load. Advantageously, this surface is complemented by a surface which is perpendicular to it and is directed toward the outside of the module and at the joining surface on the module.

The invention makes it possible to envision all kinds of loading, including bulk, by carrying suitable buckets, which can also be modular, or else tanks, said accessory containers or tanks of the invention advantageously being produced with a support base having dimensions identical to those of an ISO standard container.

In this connection, dimensions in feet are usually used in the field of containers and are used in French standards such as NF ISO 668. The reader will find below the approximate metric values, to one decimal place, of the dimensions mentioned in the present application:

8 feet: 2.4 m
10 feet: 3.0 m
15 feet: 4.6 m
20 feet: 6.1 m
30 feet: 9.1 m
40 feet: 12.2 m
45 feet: 13.7 m
48 feet: 14.6 m
53 feet: 16.2 m
60 feet: 18.3 m.

The invention claimed is:

1. A module for a modular chassis of a vehicle for transporting heavy loads, the module comprising:
   at least at one of its ends a joining surface having at least one oblique support surface extending between two planar surfaces being parallel to one another and inclined with respect to said oblique support surface;
   at least two side members having a U-shaped profile with a variable section being optimized for mechanical strength in a longitudinal direction; and
   at least one cross member submodule for taking the load in a transverse direction;
   said side members and cross member forming a flexurally and torsionally rigid box assembly.

2. The module according to claim 1, wherein said cross member submodule forms a V-block for centering the load at the same time as means for stopping at sloped wedges being terminated at their upper end or turned toward the load by radiused regions formed of connected tubes or rounds.

3. The module according to claim 1, wherein said cross member submodule has arms protruding in an offset manner toward the outside with respect to said side members and being protected on either side by oblique bumpers in the form of slides configured to be able to deflect said module during a collision with an obstacle.

4. The module according to claim 3, wherein said oblique bumpers form stiffening means for said arms in a horizontal plane.

5. The module according to claim 1, which further comprises inertial blocker submodules each having at least one mobile stop configured to come into abutment against a fixed stop.

6. The module according to claim 5, wherein some of said inertial blocker submodules are configured to act in a longitudinal direction of said module and others of said inertial blocker submodules are configured to act in a transverse direction of said module.

7. A method for fitting together pairs of modules for a modular chassis of a vehicle for transporting heavy loads, the method comprising the following steps:
   providing at least one end of each of two modules with a joining surface having at least one oblique support surface extending between two planar surfaces being parallel to one another and inclined with respect to the oblique support surface;
   placing the two modules end to end in order to engage a joining surface on one of the modules with a complementary joining surface on the other module, such that the joining surface and the complementary joining surface form together an assembly having an oblique scarf joint, having an unconnected skew scarf joint or having a key; and
   securing the modules with at least one key or/and fitting.

8. A modular chassis of a vehicle for transporting heavy loads, the modular chassis comprising:
   at least two modules each having at least at one of its ends a joining surface having at least one oblique support surface extending between two planar surfaces being parallel to one another and inclined with respect to said oblique support surface;
   said joining surface configured to engage with a complementary joining surface on another module; and
   said joining surface and said complementary joining surface together forming an assembly having an oblique scarf joint, having an unconnected skew scarf joint or having a key.

9. The chassis according to claim 8, wherein the chassis is dimensioned to carry ISO marine containers of 8, 10, 15, 20, 30, 40, 45, 48, 50, 53 or 60 feet.

10. The chassis according to claim 8, wherein said modules are each longitudinally dimensioned to hold a submultiple, an exact number or a multiple of a 20 foot ISO 668 standard container.

11. A port vehicle, comprising:
   at least one chassis according to claim 8.

12. The port vehicle according to claim 11, wherein the port vehicle is a self-propelled vehicle for transporting containers, or a port trailer for transporting containers, or a semi-trailer for transporting containers.

* * * * *